(12) United States Patent
Elstorpff et al.

(10) Patent No.: US 9,550,503 B2
(45) Date of Patent: Jan. 24, 2017

(54) BRAKE CONTROL DEVICE FOR A BRAKE SYSTEM, BRAKE SYSTEM, RAIL VEHICLE AND METHOD FOR OPERATING A BRAKE SYSTEM

(75) Inventors: Marc-Gregory Elstorpff, Munich (DE); Rainer Rau, Geretsried (DE); Robert Haupt, Munich (DE)

(73) Assignee: KNORR-BREMSE SYSTEME FÜR SCHIENENFAHRZEUGE GMBH, Munich (DE)

( * ) Notice: Subject to any disclaimer, the term of this patent is extended or adjusted under 35 U.S.C. 154(b) by 0 days.

(21) Appl. No.: 14/342,675

(22) PCT Filed: Sep. 7, 2012

(86) PCT No.: PCT/EP2012/067571
§ 371 (c)(1),
(2), (4) Date: Mar. 13, 2014

(87) PCT Pub. No.: WO2013/034735
PCT Pub. Date: Mar. 14, 2013

(65) Prior Publication Data
US 2014/0222258 A1    Aug. 7, 2014

(30) Foreign Application Priority Data
Sep. 9, 2011 (DE) .................. 10 2011 113 026

(51) Int. Cl.
*B61H 13/00* (2006.01)
*B60T 8/17* (2006.01)
*B60T 17/22* (2006.01)

(52) U.S. Cl.
CPC ............ *B61H 13/00* (2013.01); *B60T 8/1705* (2013.01); *B60T 17/228* (2013.01); *B60T 2270/406* (2013.01)

(58) Field of Classification Search
CPC .............. B61H 13/00; B61H 1/00–15/0092; B60T 1/00–8/96; B60T 10/00–13/748; B60T 15/00–17/228; B60T 2201/00–2270/89
(Continued)

(56) References Cited

U.S. PATENT DOCUMENTS 5,201,834 A * 4/1993 Grazioli et al. .......... 246/169 R
5,808,909 A * 9/1998 Rees ............................ 702/114
(Continued)

FOREIGN PATENT DOCUMENTS

DE          3638837 A1    7/1987
DE          4425598 C1    12/1995
(Continued)

OTHER PUBLICATIONS

Glaeser et al., DE102007034799, Feb. 5, 2009 (Machine Translation).*
(Continued)

*Primary Examiner* — Courtney Heinle
(74) *Attorney, Agent, or Firm* — Barnes & Thornburg LLP (57) ABSTRACT

A brake control device for a brake system for a rail vehicle, the brake system having at least one adhesion-type friction brake device. The brake control device receives brake actuation data, which are assigned to the at least one adhesion-type friction brake device, from a brake actuation sensor device of the brake system. The brake control device receives brake action data, which are assigned to the at least one adhesion-type friction brake device, from a brake action sensor device of the brake system, and to cause the adhesion-type friction brake device to effect a braking process, and to monitor and assign brake actuation data and brake action data to each other during a braking process. Also (Continued)

disclosed is a brake system, a rail vehicle and a method for operating a brake system.

8 Claims, 2 Drawing Sheets

(58) Field of Classification Search
USPC .......................................................... 701/19
See application file for complete search history.

(56) References Cited

U.S. PATENT DOCUMENTS

| 6,332,354 | B1* | 12/2001 | Lalor et al. ..................... 73/121 |
|---|---|---|---|
| 2004/0036351 | A1* | 2/2004 | Mayer et al. ................. 303/139 |
| 2009/0198406 | A1* | 8/2009 | Brown et al. .................... 701/31 |
| 2010/0138125 | A1* | 6/2010 | Edlinger ............... B60T 17/228 701/70 |
| 2011/0231039 | A1* | 9/2011 | Leitel et al. .................... 701/19 |
| 2013/0125637 | A1* | 5/2013 | Koch et al. ..................... 73/121 |
| 2014/0032023 | A1* | 1/2014 | Kumar et al. .................. 701/20 |
| 2014/0222258 | A1* | 8/2014 | Elstorpff et al. ................ 701/19 |
| 2014/0229057 | A1* | 8/2014 | Schneider et al. ........... 701/32.8 |

FOREIGN PATENT DOCUMENTS

| DE | 19755112 A1 | 6/1998 |
|---|---|---|
| DE | 10026687 A1 | 12/2001 |
| EP | 0391047 A1 | 10/1990 |
| EP | 1288095 A2 | 3/2003 |
| JP | H02290772 A | 11/1990 |
| JP | 2001141611 A | 5/2001 |
| WO | 2009013172 A1 | 1/2009 |

OTHER PUBLICATIONS

Olsson et al., DE19745581, Apr. 22, 1999 (Machine Translation).*
International Preliminary Report on Patentability and Written Opinion of the International Search Authority for International Patent Application No. PCT/EP2012/067571, dated Sep. 7, 2012.
English Translation of International Preliminary Report on Patentability and Written Opinion of the International Search Authority for International Patent Application No. PCT/EP2012/067571, dated Sep. 7, 2012.
Search Report for International Patent Application No. PCT/EP2012/067571; Mar. 1, 2013.
Japanese Office Action for Corresponding Japanese Application No. 2014-529004, dated Aug. 29, 2016.

* cited by examiner

BRAKE CONTROL DEVICE FOR A BRAKE SYSTEM, BRAKE SYSTEM, RAIL VEHICLE AND METHOD FOR OPERATING A BRAKE SYSTEM

PRIORITY CLAIM

This patent application is a U.S. National Phase of International Patent Application No. PCT/EP2012/067571, filed 7 Sep. 2012, which claims priority to German Patent Application No. 10 2011 113 026.1, filed 9 Sep. 2011, the disclosures of which are incorporated herein by reference in their entirety.

FIELD

Disclosed embodiments relate to a brake control device for a brake system for a rail vehicle, to a brake system for a rail vehicle, to a rail vehicle having a brake control device and/or a brake system, and to a method for operating a brake system of a rail vehicle.

BACKGROUND

One of the most important and most safety-relevant systems of a rail vehicle is the brake system. Nowadays, in modern rail vehicles, pneumatic brakes are commonly used as service brakes, the pneumatic brakes being supplemented by further brake systems if appropriate. In the case of a pneumatic brake, a brake pressure is exerted on a force generator, for example a pneumatic cylinder, which thereupon brings friction elements of a friction brake device into frictional contact to bring about a braking operation. To test the functionality of such friction brake elements, it is generally the case that, before a train sets off, a brake signal is generated and it is checked, by means of pressure sensors, whether a brake pressure corresponding to the brake signal is generated.

Disclosed embodiments permit improved monitoring of brake apparatuses of rail vehicles.

BRIEF DESCRIPTION OF THE FIGURES

Disclosed embodiments will be explained, by way of an example, with reference to the appended drawings, in which.

DETAILED DESCRIPTION OF THE DISCLOSED EMBODIMENTS

Within the context of this description, a rail vehicle may refer to one or more carriages with or without intrinsic drive and/or a tractor vehicle in any desired combination. In particular, a rail vehicle may have drive carriages. A rail vehicle or a carriage of the rail vehicle may have bogies on which wheel axles of the vehicle are arranged. The bogies may be fastened to a carriage superstructure. A brake system may be a pneumatic, electropneumatic, hydraulic, electrohydraulic, electric or electromechanical brake system, and may in particular have one or more corresponding brake apparatuses. A brake apparatus may in particular be an adhesion-based friction brake apparatus which enables a braking force to be transmitted via a wheel-rail contact point. Such an adhesion-based friction brake apparatus may for example be a block brake apparatus, a disk brake apparatus or a combined disk and block brake apparatus. A disk brake apparatus such as a magnetic rail brake, for example, is not an adhesion-based friction brake apparatus in this context because it transmits its braking force not via a wheel-rail contact point but by way of inherent frictional contact with the rail. An adhesion-based friction brake apparatus may have one or more friction brake devices. An adhesion-based friction brake apparatus may have one or more force generators. A force generator may be designed such that, when charged with an actuation medium such as a brake pressure or an electrical brake current, it actuates a friction brake device for a braking operation. A friction brake apparatus having a force generator which is actuated by means of a brake pressure may be referred to as a pressure-actuated brake apparatus. A pressure-actuated brake apparatus may in particular be a pneumatic or hydraulic brake apparatus. A friction brake apparatus having a force generator which is actuated by means of an electrical current may be referred to as an electrically actuated brake apparatus and may, in particular, be an electrical or electromechanical brake apparatus. A pressure actuated brake apparatus may have electrically actuable valves such as solenoid valves and/or electrically actuable pilot-control valves, and may correspondingly be referred to as an electropneumatic or electrohydraulic brake apparatus. A friction brake device may be designed such that, when one or more force generators is or are charged with an actuation medium such as a hydraulic or pneumatic brake pressure or a brake current, it generates a braking torque that acts on a wheel and/or an axle of the vehicle. A pressure-actuated brake apparatus or a friction brake device may for example have, as force generator, a pneumatic or hydraulic cylinder which, when charged with a pneumatic or hydraulic pressure, actuates the friction brake device for a braking operation. An electrically actuated brake apparatus or friction brake device may, as force generator, have an electrically actuated actuator which is capable of converting an electrical current into a brake actuation. A friction brake device may in particular have multiple friction elements which are provided for making frictional contact with one another. In particular, at least one friction pairing with two friction elements may be provided. For example, a friction brake device may have a brake disk which is designed so as to be placed in frictional contact with one or more brake pads, which are provided with a brake lining, when the brake is actuated. Alternatively, a friction brake device may have one or more brake blocks with associated brake lining, which brake blocks are placed in frictional contact with a wheel surface of a wheel when the brake is actuated. The pressure that is exerted on the force generator or on the pneumatic or hydraulic cylinders for the actuation of the friction brake device may be referred to as brake pressure. An electrical current provided for the actuation of a force generator may be referred to as brake current. A friction brake device may be designed to brake an individually suspended wheel and/or a wheel axle which has at least two wheels rigidly connected to one another. A friction brake device may thus be associated with at least one wheel. Here, a friction brake device may be arranged or suspended on the bogie on which the axle associated therewith and/or the wheel associated therewith is arranged. The force exerted by the force generator during the actuation of a friction brake device may be referred to as braking force. The braking force is dependent on the exerted brake pressure or brake current and on the construction, state and mode of operation of the friction brake device. The braking torque may be regarded as the torque that is exerted on a wheel during braking. The braking torque is in particular dependent on the braking force and on the wheel geometry, in particular on a wheel diameter. Braking force may also act in the case of a wheel which is not in motion, for example to place a brake lining in contact with a wheel running surface or with a brake disk. In the case of a wheel which is in motion, a braking force generates an associated braking torque. A brake control device may be an electronic control device for a brake system of a rail vehicle. The brake control device may, for example, be an antiskid computer, a brake computer or a control device of some other control device of the brake system of a rail vehicle. A brake action sensor device may be designed to detect an actual braking action which is exerted on a wheel and/or an axle. It is in particular conceivable for a brake action sensor device to be a braking force sensor device which can detect a braking force and/or an associated braking torque exerted on at least one friction brake device associated therewith. It is thus possible for a brake action sensor device to be designed for example to detect a braking force exerted by at least one friction brake device and/or a braking torque exerted by the at least one friction brake device. For this purpose, a brake action sensor device may for example comprise one or more sensors which may be arranged for example at a suspension point at which a friction brake device is mounted on a bogie. A brake action sensor device may in particular have one or more strain gauges. Elements, for example sensors, of the brake action sensor device may be arranged on movable and/or rigid elements of the friction brake device and/or of the suspension thereof to measure, during an actuation of the friction brake device, a reaction generated by a friction partner such as a wheel or a brake disk. The braking force and/or the braking torque can be inferred from a reaction of the type. Such a reaction may be manifested as a deformation that can be detected for example by means of strain gauges. The brake action sensor device may be provided for detecting the braking force and/or the braking torque for more than one friction brake device. In general, a sensor device can provide signals that represent measurement results. Such signals may be corresponding data that can be received by a control device. A brake actuation sensor device may be designed to detect a variable that relates to and/or represents the actuation of a friction brake apparatus, which variable may in particular be a brake pressure of a pressure-actuated brake apparatus and/or a brake current of an electrically actuated brake apparatus.

Disclosed embodiments relate to a brake control device for a brake system for a rail vehicle, wherein the brake system comprises at least one adhesion-based friction brake apparatus. The brake control device is designed to receive brake actuation data, associated with the at least one adhesion-based friction brake apparatus, from a brake actuation sensor device of the brake system. The brake control device is furthermore designed to receive brake action data, associated with the at least one adhesion-based friction brake apparatus, from a brake action sensor device of the brake system. The brake control device is furthermore designed to actuate the adhesion-based friction brake apparatus for a braking operation and to associate brake actuation data and brake action data with one another, and monitor the data, during a braking operation. In this way, during a braking operation, brake actuation data and brake action data can be monitored to check the functioning of the adhesion-based friction brake apparatus even during a braking operation. In particular, the brake control device may be designed to perform a braking operation during travel, that is to say when the rail vehicle is in motion.

The brake control device may have one or more separate control device components. For example, one component may be designed for the actuation of the brake, and a further component may be designed for receiving brake actuation data and brake action data and/or associating the data with one another. The adhesion-based friction brake apparatus may be a pressure-actuated or an electrically actuated brake apparatus. A pressure-actuated brake apparatus may have one or more control valve arrangements by means of which a brake pressure can be provided. It may be provided that a pressure-actuated brake apparatus has a main control valve device by means of which a common brake pressure, for example a main brake pressure, can be provided to multiple friction brake devices of the brake apparatus. Here, the brake control device and/or a component of the brake control device may be designed for actuating the control valve device or control valve devices of the pressure-actuated brake apparatus to actuate the pressure-actuated brake apparatus for a braking operation.

An adhesion-based friction brake apparatus may have one or more friction brake devices. In the case of a pressure-actuated brake apparatus, provision may be made not only of a main control valve device but also of additional control valve devices, for example with discharge valves, by means of which the friction brake devices of the pressure-actuated brake apparatus, or force generators associated therewith, can be supplied in each case with a brake pressure. In particular, it may be provided that such additional control valve devices can be supplied with a common brake pressure. The additional control valves may be part of an antiskid device. Through suitable actuation of the additional control valve devices by means of the brake control device, the common brake pressure can be modified in each case to an individual brake pressure that can act for the actuation of one or more friction brake devices.

A brake pressure of the type may vary in an individual manner, and may in particular differ from a main brake pressure that is provided. An additional control valve device may be assigned in each case one or more friction brake devices which can be supplied with brake pressure by means of the control valve device.

An electrically actuated brake apparatus may comprise one or more current sources by means of which an electrical brake current can be provided to one or more force generators in a manner determined by the brake control device. It may be provided that different force generators can be supplied, and/or are supplied, with different brake currents in a manner determined by the brake control device. The brake actuation sensor device may have one or more sensors. It may be provided that the brake actuation sensor device has one or more brake pressure sensors and can thus be regarded as a brake pressure sensor device.

Correspondingly, brake actuation data may represent a brake pressure and/or may be brake pressure data. The brake actuation sensor device may have one or more sensors for the determination of an electrical brake current, and may thus be regarded as a brake current sensor device. Correspondingly, brake actuation data may represent an electrical brake current and/or may be brake current data. In general, brake actuation data may comprise brake pressure data and/or brake current data. It may be expedient for the brake actuation sensor device to be connected or connectable to the brake control device for the transmission of brake actuation data. The brake actuation sensor device may have brake pressure sensors and/or brake current sensors associated with individual force generators and/or control valve devices of the adhesion-based friction brake apparatus.

The brake actuation sensor device may be designed to measure at least one brake pressure or brake current that is supplied to a force generator for the actuation of the brake device associated with the force generator. In particular, it may be provided that a brake actuation sensor device such as a brake pressure sensor device is designed to measure a main brake pressure and/or at least one brake pressure that prevails individually at a force generator and/or downstream of a control valve device.

Brake pressure data may thus relate to or specify a main brake pressure and/or at least one brake pressure that prevails at a force generator and/or downstream of a control valve device. In particular, brake pressure data of the type may be regarded as brake pressure data associated with the adhesion-based friction brake apparatus. It may be provided that a brake actuation sensor device such as a brake current sensor device is designed to measure a main brake current and/or at least one brake current that prevails individually at a force generator.

Brake current data may thus relate to or specify a main brake current and/or at least one brake current that prevails at a force generator. In particular, such brake current data may be regarded as brake current data associated with the adhesion-based friction brake apparatus. Brake current data and/or brake pressure data may be regarded as actuation data.

The brake action sensor device may comprise one or more brake action sensors. Brake action data may specify or relate to a braking action exerted on a wheel during a braking operation. A brake action sensor may in particular be a braking force sensor which can measure a braking force and/or a braking torque. Brake action data may thus be braking force data which specify and/or relate to a braking force imparted by at least one friction brake device and/or a braking torque. A brake action sensor or the brake action sensor device may be assigned to at least one friction brake device of the brake apparatus.

Brake action data from such a sensor device associated with a friction brake device and/or from a sensor of the type may be regarded as brake action data associated with the pneumatic brake apparatus. A brake action sensor may be in direct mechanical contact with a component of a friction brake device and/or with a suspension means of the friction brake device. In particular, a brake action sensor may be designed to measure a material deformation from which a braking action can be inferred.

It may be expedient for the brake action sensor device to be connected or connectable to the brake control device for the transmission of brake action sensor data. In particular, it may be provided that a brake action sensor can measure the braking force exerted on a wheel or on an axle by a friction brake device. The actuation of the adhesion-based friction brake apparatus by the brake control device may be ensured for example by virtue of the brake control device being capable of electrically actuating control valve devices of the adhesion-based friction brake apparatus and/or being capable of actuating a current supply for the provision of one or more electrical brake currents. Here, at least one certain brake pressure or brake current can be provided.

During a braking operation that may be performed by means of the brake control device, the brake control device receives brake actuation data such as brake pressure data and/or brake current data and also brake action data. The brake control device can associate the data with one another such that, for example, brake action data that are associated with in each case one adhesion-based friction brake apparatus or one particular friction brake device of the adhesion-based friction brake apparatus are associated with brake actuation data that are associated with the adhesion-based friction brake apparatus or friction brake device.

The brake control device may be designed to correlate brake actuation data and brake action data with one another. In particular, the brake control device may perform a temporal correlation and/or synchronization of the brake actuation data and brake action data. The brake control device may be designed to determine a temporal relationship between brake actuation data and brake action data and/or a temporal variation of a relationship between brake actuation data and brake action data.

A relationship between brake actuation data and brake action data may be a functional relationship and may be defined for example by a ratio between mutually correlated brake actuation data and brake action data. Monitoring of the brake actuation data and of the brake action data may encompass a check as regards whether or not a predetermined relationship between brake actuation data and brake action data is satisfied. For example, it may be monitored as to whether, in the event of a certain actuation being performed and/or being measured by the brake actuation sensor device, in particular in the event of a certain brake pressure or brake current being generated and/or measured, a certain braking action is attained.

It is conceivable for the brake control device to be designed to process braking force data to determine the braking force that is imparted by a friction brake device. Here, it must be taken into consideration that, if a wheel to be braked is in motion, a reaction of the rotating wheel may be registered by a braking force sensor. In particular, the brake control device may be designed to calculate the braking force, and any braking torque that may arise, from braking force data. Here, the brake control device may be designed to make use of stored model parameters that describe the at least one friction brake device. It is however also conceivable for the braking force sensor device to be provided with a computer unit that can process braking force data.

With regard to such processing, it may be provided that the computer unit or the control device calculates braking force and braking torque, outputs the braking force and braking torque correspondingly identified and formatted braking force data, and if appropriate transmits the data to the brake control device. Here, a computer unit may be regarded as part of the brake control device or may be associated with the sensor device. The brake control device may be designed to perform a functional diagnosis as part of the monitoring of the brake actuation data and brake action data.

The braking operation may be a test braking operation. For a test braking operation, the brake control device may actuate the adhesion-based friction brake apparatus with a predetermined brake pressure or brake current and/or a predetermined braking action, in particular with a predetermined braking force. Here, the predetermined brake pressure or brake current and/or the predetermined braking action may relate to one or more friction brake devices. Here, a test braking operation should serve primarily not for the braking of the rail vehicle but rather for the monitoring and testing of the adhesion-based friction brake apparatus.

During the test braking operation, a low brake pressure and/or brake current may be applied and/or a low braking action may be generated. In particular, it may be provided that brake pressure or brake current and/or braking force are lower than in the case of a rapid braking operation or emergency braking operation. A test braking operation may in particular be performed while the vehicle is being driven for travel.

The brake control device may particularly expediently be designed to perform a test braking operation while the vehicle is traveling, that is to say when the rail vehicle is in motion. This makes it possible, for example, to check whether only a braking force for a friction brake device is generated, or whether a braking torque is also generated, when a brake pressure or brake current is applied. This is because a braking torque of the type would significantly change the signal of a braking force sensor device in relation to a situation in which only a braking force prevails. If only a braking force but not a braking torque prevails when brake pressure or brake current is applied during travel, it can for example be assumed that the associated wheel is locked and is not rotating, or not rotating as desired.

The adhesion-based friction brake apparatus may have multiple friction brake devices that can be actuated separately from one another by the brake control device. This yields a flexible actuation of the brakes. A separate actuation may mean the actuation of control valve devices or current supplies such that force generators are supplied with different brake pressures or brake currents and/or such that different friction brake devices are actuated with different brake pressures or brake currents.

In particular, the brake control device may be designed to actuate the multiple friction brake devices in a time-delayed manner for a test braking operation. A test braking operation may thus comprise multiple braking operations that are spaced apart in terms of time. It is thus possible to prevent the vehicle from being braked to an excessive extent during travel by test braking operations. Furthermore, this yields a lower consumption of compressed air or consumption of current for an individual braking operation. In particular, the friction brake devices may be actuated in a predetermined sequence.

In this context, it may be provided that the rail vehicle, in particular a carriage of the rail vehicle, has at least two bogies. At least two wheel axles may be provided on each bogie. Each wheel axle of a bogie may have at least one friction brake device associated therewith, wherein different wheel axles of a bogie may have different wheel brake devices associated therewith. It is thus possible for multiple friction brake devices to be provided on one bogie. It may be provided that the friction brake devices on the different bogies can be supplied, by a common main control valve device or current supply, with a common brake pressure or brake current which may be individually modifiable, for example by means of additional control valve devices associated with in each case one friction brake device.

The brake control device may be designed to actuate the adhesion-based friction brake apparatus for actuation of the friction brake devices of the bogies in a predetermined sequence. It may be provided here that the friction brake devices are actuated in a bogie-specific manner. It may for example be provided that firstly the friction brake devices arranged on a first bogie, and then the friction brake devices arranged on a second bogie, are actuated for a braking operation. The friction brake devices on the respective bogie may in this case be actuated simultaneously or in a time-delayed manner, that is to say in a sub-sequence.

It is for example alternatively conceivable that, in a first run-through of a sequence, initially a first friction brake device of a first bogie and subsequently a first friction brake device of a second bogie is actuated for a braking operation. If further bogies are provided, the friction brake devices of which can be supplied with brake pressure by means of the same main control valve device or with brake current by means of a current supply, it is possible for the respective first friction brake devices of the further bogies to be actuated for a braking operation in succession.

If all of the first friction brake devices of the bogies have been actuated, it is possible, in a second run-through, for a second friction brake device of one of the bogies, in particular of the first bogie, to be actuated for a braking operation by means of the brake control device. Subsequently in the sequence, a respective second friction brake device of one of the further bogies can be actuated for a braking operation. The bogies can be run through in the same order in the second run-through as in the first run-through. It is also conceivable for the order of the bogies in the second run-through to differ from that in the first run-through. Further run-throughs with suitable ordering of the bogies may be provided depending on the number of friction brake devices per bogie. The brake control device may in particular be designed such that, in a sequence, it actuates a respective friction brake device of one bogie for a braking operation before successively actuating a respective friction brake device of another bogie for a braking operation.

The brake control device may be designed to perform a test braking operation at predefined intervals during travel. The predefined intervals may be time intervals. It may for example be provided that the brake control device is set up to perform a test braking operation at predefined time intervals. It is also conceivable for the predefined intervals to be spatial intervals, such that a test braking operation is performed for example when a certain distance has been traveled. A test braking operation performed in this way may involve one or more friction brake devices.

In one refinement, the brake control device may be designed to store brake action data and associated brake actuation data. In this way, data sets can be compiled for long-term monitoring or for later analysis of the braking behavior. In this context, the brake control device may be connected or connectable to a memory device. A memory device of the type may be assigned to the brake control device. It may be provided in particular that the brake control device is designed to monitor, on the basis of stored brake action data and brake actuation data, a profile with respect to time of the behavior of friction brake devices. In particular, it is conceivable for the brake control device to be designed to monitor the profile with respect to time of brake action data, and of brake actuation data associated therewith, for individual friction brake devices. For example, the profile of the relationship between braking force and brake pressure or brake current for at least one friction brake device may be monitored. Here, it may for example be established whether and/or how the braking force generated by a friction brake device at a particular brake pressure or brake current changes over the course of time.

Disclosed embodiments also relate to a brake system for a rail vehicle, having a brake control device as described herein. The brake control device may in particular have a brake action sensor device as described herein and/or a brake actuation sensor device as described herein and/or at least one adhesion-based friction brake apparatus as described herein.

Disclosed embodiments also relate to a rail vehicle having a brake control device described herein and/or a brake system described herein.

Disclosed embodiments also relate to a method for operating a brake system of a rail vehicle, having the steps of actuating, by means of a brake control device, the brake system for a braking operation, of receiving, by means of the brake control device, brake actuation data transmitted by a brake actuation sensor device of the brake system, of receiving, by means of the brake control device, brake action data transmitted by a brake action sensor device of the brake system, and of associating, by means of the brake control device, brake actuation data with corresponding brake action data, and of monitoring, by means of the brake control device, mutually associated brake action data and brake actuation data. The brake control device may in particular be a brake control device as described herein. The brake system may be a brake system as described herein.

In the case of the actuation of the brake system for a braking operation, it is possible for at least one adhesion-based friction brake apparatus of the brake system to be actuated for the braking operation. It is conceivable for the braking operation to be a test braking operation. The test braking operation may be performed during travel. The adhesion-based friction brake apparatus may have multiple friction brake devices that can be actuated separately from one another by the brake control device.

The friction brake devices may be actuated separately from one another during the braking operation, in particular during a test braking operation. The multiple friction brake devices may be actuated in succession in a time-delayed manner for a test braking operation. It may be provided that a predetermined sequence is provided for the actuation of the friction brake devices. It may be provided that a test braking operation is performed at predefined intervals during travel. The predefined intervals may for example be time intervals or spatial intervals.

Provision may be made for brake action data and associated brake actuation data to be stored by means of the brake control device. The data may be called upon by the brake control device, for example, to perform a functional diagnosis, monitoring of a development over time and/or fault diagnosis.

A functional diagnosis may generally provide different results. For example, the brake control device may, as a result of the functional diagnosis when the vehicle is in motion, identify a locked axle from the fact that the brake action data are indicative of a braking torque for the locked axle or the locked wheel, without a brake pressure or brake current prevailing and/or a braking operation having been initiated. Here, a comparison may for example be performed as regards whether a significant braking force and/or a braking torque, which can be attributed to a brake pressure or brake current, prevails at the other axles and/or wheels of the vehicle.

For example, if a brake pressure or brake current prevails at the other wheels and/or a corresponding actuation has been performed, and a braking force and/or a braking torque acts as a result, then it is probable that the wheel in question is likewise being correctly braked but there is a fault in the brake pressure measurement or brake current measurement. In such a situation, a comparison with an electronic or digital actuation may assist in reaching a decision as regards whether a locked wheel or a faulty brake actuation sensor device is present. This is because it is unlikely that a faulty actuation signal and a faulty brake pressure measurement or brake current measurement will arise at the same time.

Furthermore, in the course of the functional diagnosis, it can be established whether the vehicle is in motion. This is because, if a braking force prevails owing to an intentionally applied brake pressure or brake current, the signal of a brake action sensor device when the vehicle is not in motion differs from a signal generated when a braking torque prevails, that is to say in a state of motion. This is because, when the vehicle is not in motion, while a braking force prevails, no braking torque is generated because the wheel and/or the axle is not rotating. In particular if a check of multiple wheels or axles is performed, it is possible from this to infer the state of motion of the vehicle. Also, the signals of the brake action sensor device in the case of locked wheels may differ from the signals when the train is at a standstill.

If a braking torque and/or a braking force prevails when the brake is not actuated and the vehicle is in motion, that is to say when there is no brake pressure or brake current applied to the at least one friction brake device or friction brake devices, it can be assumed that the brake is locked.

If a brake pressure or brake current is applied when the vehicle is in motion but no braking torque is detected, a malfunction of the brake may be present whereby a brake pressure or brake current is not being converted into a braking force or a braking torque.

If a locked axle or a locked wheel can be inferred from data from another sensor device, for example from wheel rotational speed data, it can be assumed in this case that the axle is locked for reasons external to the brake system. A bearing fault or a drive fault may for example be present. It is thereupon possible for a distinction to be made between a bearing defect and a drive defect by means of a temperature sensor, optionally connected or connectable to the brake control device, at the bearing.

For example, by means of such a temperature sensor, overheating of the bearing can serve as an indication of a bearing defect. If no overheating is identified, a drive defect may be present. On the basis of such a differentiation of the functional diagnosis, the traction operation can be implemented differently. For example, if a locked brake is identified in the case of a train which is at a standstill, a single brake can be placed into a neutral position and separated from a pressure supply.

Under some circumstances, the train may if appropriate then continue its journey at lower speed by means of corresponding actuation of the remaining friction brake devices and other brake systems. In the event of locking caused by a bearing or drive, it is generally necessary for emergency braking to be performed, and for the vehicle to subsequently be towed. By means of the described functional diagnosis, rolling monitoring is possible which can be implemented separately from an antiskid facility. In particular, monitoring of the rolling characteristics of axles and/or wheels is possible, which monitoring can be implemented independently of wheel rotational speed sensors.

Even if wheel rotational speed sensors provide supporting data for the described functional diagnosis, it is basically possible for a locked wheel and/or a locked axle to be performed independently of the supporting data. There is thus no need for a separate rolling monitoring device, such as is prescribed in particular for high-speed trains, which must be provided in addition to a normal brake controller and an antiskid facility.

Alternatively, the brake system and/or the rail vehicle may generally have a rolling monitoring device which may have or be connected to rotational speed sensors. A plausibility check of the data from the rolling monitoring device can thus be performed. It is conceivable here for a control device of the rail vehicle, in particular the brake control device, to be capable of performing a plausibility check of data from a rolling monitoring device. In particular, it may be provided that the control device is designed to compare data based on brake action data with data from the rolling monitoring device. Here, data based on brake action data may in particular represent a result of a functional diagnosis. Furthermore, the described test braking operation acts as a dynamic brake test during travel. If an axle or a wheel is locked when a vehicle is in motion, this results substantially in sliding friction effects between the wheel and rail, because a locked wheel substantially does not rotate. This may have the effect that periodic signals that may arise in the brake action data and/or brake actuation data in the case of a rotating wheel or a rotating axle do not appear during a sliding friction phase, that is to say when a wheel or axle is locked. It is for example possible for sliding friction or a locked axle or a locked wheel to be identified from the absence of such periodic signals. Correspondingly, the brake control device may be designed to detect and/or identify periodic and/or quasi-periodic signals in the brake action data and/or brake actuation data.

The brake control device may be designed to store detected periodic and/or quasi-periodic signals or data based on such signals. It may be provided that the brake control device is capable of comparing stored data with the present brake action data and/or brake actuation data. Based on the comparison, it is for example possible for the disappearance of a periodic signal in the case of a friction brake device, and/or the shift of the period toward greater periodicities, to be identified. This may be an indication of a locked or sliding wheel. Here, it may be expedient for the brake control device to be designed to determine a signal spectrum in the frequency range from the brake action data and/or brake actuation data, for example by means of a suitable transformation such as a Fourier transformation.

It may also be expedient for the data to be suitably normalized, for example by virtue of wheel rotational speed data being used for normalization and/or filtering of the brake data. A normal period for periodic signals may be defined as a basis for comparison, which normal period is independent of the present wheel rotational speed.

Figure 1:
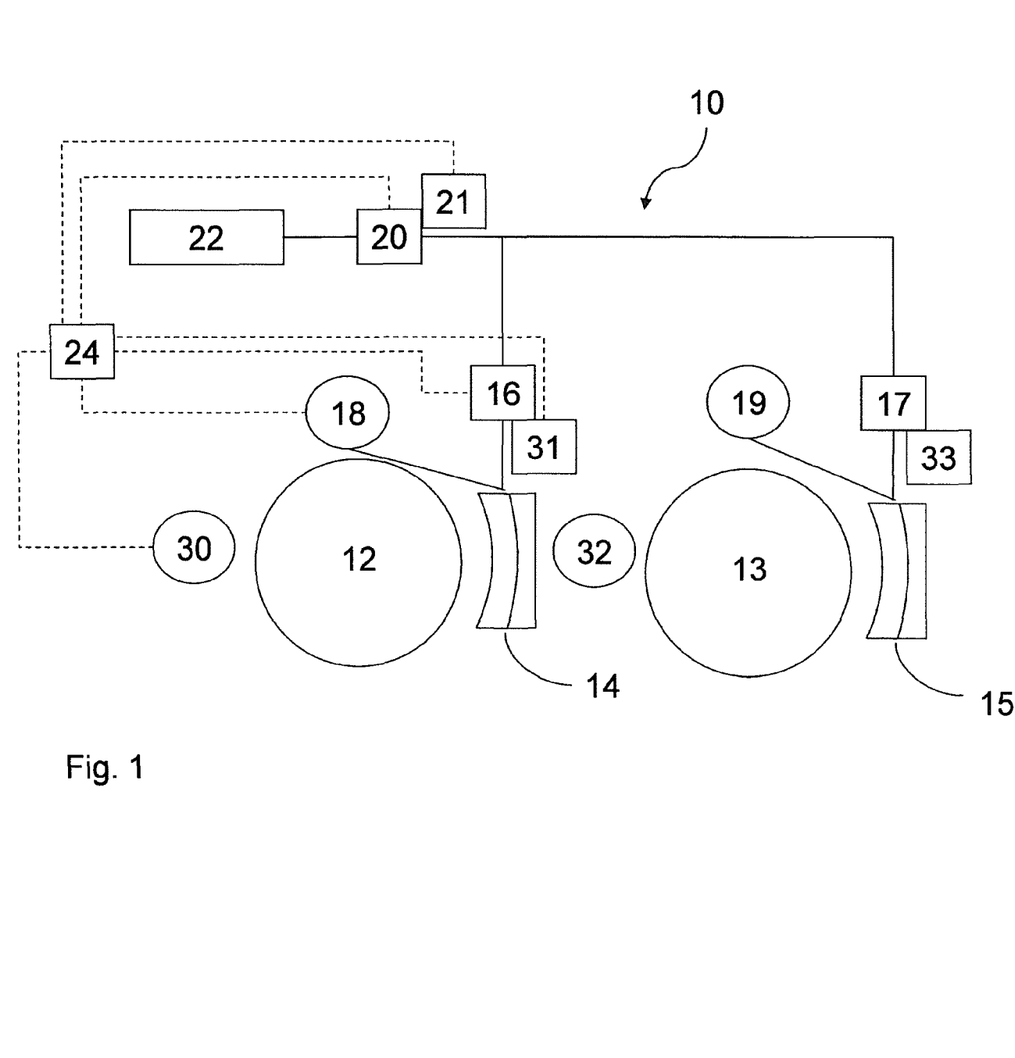
FIG. 1 is a schematic illustration of a brake system of a rail vehicle having a brake control device.

FIG. 1 schematically shows a brake system 10 of a rail vehicle having an adhesion-based friction brake apparatus which, in this example, is a pneumatic brake apparatus. Mechanical and pneumatic connections and lines are illustrated by means of solid lines, whereas electrical connections or communication channels are illustrated by means of dashed lines. The brake system 10 is provided for braking wheels 12 and 13 of the rail vehicle. In this example, the wheels 12 and 13 are situated on different wheel axles. The first wheel 12 is assigned a first brake block 14. The second wheel 13 is assigned a second brake block 15.

Each of the brake blocks 14, 15 has a brake lining which brakes the associated wheel when the brake block is pressed by way of the brake lining against the running surface of the associated wheel 12, 13. The brake block 14 can be actuated by means of a force generator 16 for braking purposes. The force generator 16 is connected via a supply line to a main control valve device 20. Compressed air can be supplied to the force generator 16 by means of the main control valve device 20. Similarly, the brake block 15 is assigned a force generator 17 to which compressed air can be supplied, likewise by means of the main control valve device 20, for the actuation of the force generator for the brake block 15 to be placed in contact with the wheel running surface of the wheel 13.

The main control valve device 20 is connected to a compressed-air accumulator device 22, from which it can extract compressed air to provide the compressed air to the force generators 16, 17 during a braking operation. Furthermore, an electronic brake control device 24 is provided which is a brake computer and which is capable of actuating the main control valve device 20. For this purpose, the main control valve device 20 may in particular have one or more solenoid valves that can be actuated by the brake control device 24.

For clarity, the electrical control lines for the components associated with the second wheel are not illustrated. The electrical control lines are however similar to the control lines associated with the first wheel and its components. The first wheel 12 also has associated therewith a brake action sensor 18 which is capable of determining a braking force and/or a braking torque exerted on the brake block 14 during a braking operation.

The brake action sensor 18 can thus be regarded as a braking force sensor. A brake action sensor of the type may for example have one or more strain gauges. The sensor 18 is connected to the electronic brake control device 24 for the transmission of data. Furthermore, the wheel 12 has associated therewith a first wheel rotational speed sensor 30 which is capable of measuring the rotational speed of the wheel 12. The sensor is also connected to the electronic control device 24 for the transmission of data. Similarly, the second wheel is assigned a second brake action sensor 19 that is capable of determining a braking force and/or a braking torque exerted on the brake block 14.

Furthermore, the second wheel 13 also has associated therewith a second wheel rotational speed sensor 32. The sensors 18, 19 may each be regarded as being part of a brake action sensor device. The wheel rotational speed sensors 30, 32 may each be regarded as part of a wheel rotational speed sensor device. The force generators 16, 17 may each comprise pneumatic cylinders which, when charged with a brake pressure, exert a braking force on the associated brake block 14, 15. The force generators 16, 17 may furthermore each have a control valve device which can be actuated by the electronic control device 24 and by means of which a main brake pressure provided by the main control valve device 20 can be set individually for the respective pneumatic cylinder of the force generators 16, 17.

It is thus possible in particular for the force generators 16, 17 to apply different brake pressures to the brake blocks 14, 15, and thus actuate or control the friction brake devices asymmetrically or separately, in a manner determined by the electronic control device 24. The main control valve device 20 has associated therewith a main brake pressure sensor 21 that is capable of measuring the main brake pressure provided by the main control valve device 20. The pressure sensor 21 is connected to the electronic control device 24 for transmission of data. Furthermore, the force generator 16 has associated therewith a first brake pressure sensor 31, and the second force generator 17 has associated therewith a second brake pressure sensor 33. The first and the second brake pressure sensor 31, 33 are in each case designed to measure the brake pressure provided individually, for the generation of a braking force, by the associated force generator 16, 17. The sensors 31, 33 and the main brake pressure sensor 21 may be regarded as being part of a brake pressure sensor device. The brake pressure sensors 21, 31, 33 are likewise connected to the electronic brake control device 24 for the transmission of data.

It is thus possible for the electronic brake control device 24 firstly to measure the introduced main brake pressure downstream of the main control valve device 20. Secondly, the brake control device 24 receives in each case the brake pressure that acts individually, for the generation of braking force, at the individual force generators 16, 17. In FIG. 1, the force generator 16 with the brake block 14 can be regarded as first friction brake device. The force generator 17 and the second brake block 15 may be regarded as second friction brake device. It is self-evident that both friction brake devices may have associated brake linkages and suspension means which are not shown. The main control valve device 20 together with the friction brake devices may be regarded as pneumatic brake apparatus.

Instead of block brakes, the friction brake devices may also be disk brakes. In this case, too, in each case one brake action sensor may be provided which is capable of measuring a braking force and/or a braking torque exerted during the braking operation and transmitting corresponding brake data to the electronic brake control device 24. The brake control device 24 is designed to receive brake action data from the brake action sensors 18, 19 and brake pressure data from the brake pressure sensors 21, 31, 33. Furthermore, the brake control device 24 associates the brake pressure data with corresponding brake action data, and monitors the mutually associated data.

Figure 2:
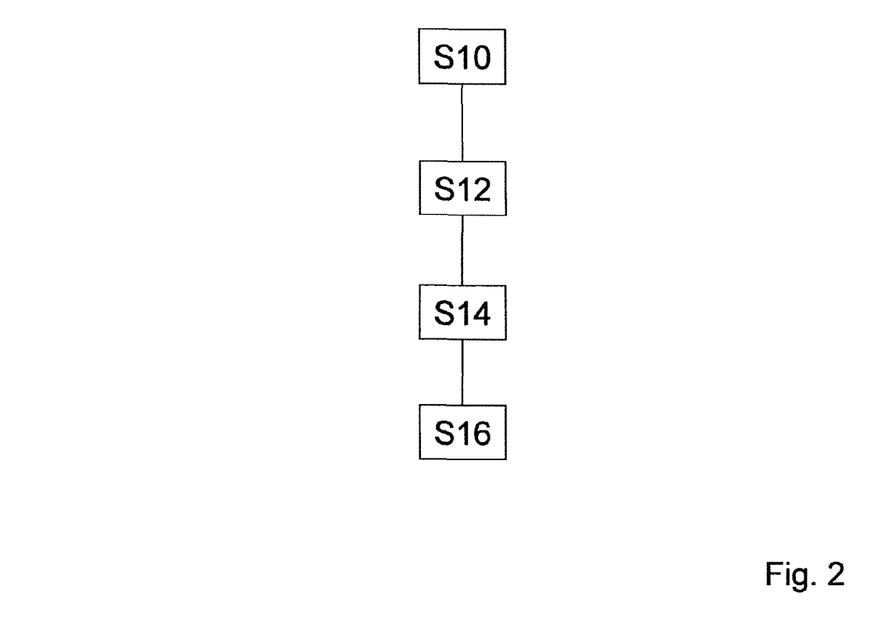
FIG. 2 schematically shows a flow diagram of a method for the operation of a brake system of a rail vehicle.

FIG. 2 shows a flow diagram of a method for the operation of a brake system of a rail vehicle. The brake system may for example be a brake system shown in FIG. 1. In a step S10, a brake control device of the brake system actuates the brake system for a braking operation. Here, an adhesion-based friction brake apparatus of the brake system may be actuated for the braking operation.

It is however also conceivable for further components of the brake system to be actuated for the braking operation, for example a magnetic rail brake or an eddy-current brake. In a subsequent step S12, the brake control device receives brake actuation data, for example brake pressure data. The brake actuation data are transmitted by a suitable brake actuation sensor device of the brake system and represent at least one brake pressure or brake current associated with an adhesion-based friction brake apparatus of the brake system. In the event that the adhesion-based friction brake apparatus is not actuated for the braking operation, it can be assumed that the brake actuation data represent a brake pressure or brake current of zero.

However, if some other value of the brake pressure or brake current prevails, a malfunction either of the brake actuation sensor device or of the adhesion-based friction brake apparatus can be inferred. Likewise in step S12, the brake control device receives brake action data, in particular braking force data, which are transmitted by a corresponding brake action sensor device of the brake system. The brake action sensor device may in particular be associated with friction brake devices of the adhesion-based friction brake apparatus. In a step S14 that may be performed during the receiving of the brake action data and of the brake actuation data, if appropriate after a slight time delay or substantially in parallel therewith, the brake control device associates the brake actuation data with corresponding brake action data.

Here, the association may in particular be performed such that brake actuation data that relate to a certain friction brake device are associated with brake action data that relate to the same friction brake device. In a subsequent step S16, the brake control device monitors mutually associated brake action data and brake actuation data. In particular, the brake control device may check whether the respectively associated brake action data and brake actuation data indicate a malfunction of the associated friction brake device or of the adhesion-based friction brake apparatus. For example, the brake control device may monitor whether, in the case of a certain brake pressure or brake current, there is a resulting predefined minimum braking force, and/or, in the case of a certain braking force, a predefined minimum brake pressure or minimum brake current prevails.

Deviations of minimum braking force or minimum brake pressure or minimum brake current may indicate a malfunction of the friction brake device and/or of the adhesion-based friction brake apparatus.

The features of the invention disclosed in the above description, in the drawings and in the claims may be essential, both individually and also in any desired combination, to the realization of the invention.

REFERENCE NUMERALS

10 Brake system
12 First wheel
13 Second wheel
14 First brake block
15 Second brake block
16 First force generator
17 Second force generator
18 First braking force sensor
19 Second braking force sensor
20 Main control valve device
21 Main brake pressure sensor
22 Compressed-air accumulator device
24 Brake control device
30 First wheel rotational speed sensor
31 First brake pressure sensor
32 Second wheel rotational speed sensor
33 Second brake pressure sensor

The invention claimed is:

1. A brake control device for a brake system for a rail vehicle, wherein:
the brake system comprises at least one adhesion-based friction brake apparatus;
the brake control device receives brake actuation data associated with the at least one adhesion-based friction brake apparatus from a brake actuation sensor device of the brake system, the brake actuation sensor device sensing a material deformation;
the brake control device receives brake action data associated with the at least one adhesion-based friction brake apparatus from a brake action sensor device of the brake system, the brake action data comprising at least braking torque data;
the brake control device actuates the adhesion-based friction brake apparatus for a braking operation and associates brake actuation data and brake action data with one another, and monitors the data during a braking operation;
the device diagnoses a function of the rail vehicle wherein the function is a state of motion, the state of motion including in motion and not in motion,
a brake malfunction is determined based on the monitoring of the function of the rail vehicle and the associated brake action and brake actuation data,
the braking operation is a test braking operation, and
the brake control device performs a test braking operation during travel.

2. The brake control device of claim 1, wherein the adhesion-based friction brake apparatus has multiple friction brake devices actuated separately from one another by the brake control device.

3. The brake control device of claim 2, wherein the brake control device actuates the multiple friction brake devices in a time-delayed manner for a test braking operation.

4. The brake control device of claim 1, wherein the brake control device performs a test braking operation at predefined intervals during travel.

5. The brake control device of claim 1, wherein the brake control device stores brake action data and associated brake actuation data.

6. A brake system for a rail vehicle, having a brake control device wherein:
- the brake system comprises at least one adhesion-based friction brake apparatus;
- the brake control device receives brake actuation data associated with the at least one adhesion-based friction brake apparatus from a brake actuation sensor device of the brake system, the brake actuation sensor device sensing a material deformation;
- the brake control device receives brake action data associated with the at least one adhesion-based friction brake apparatus from a brake action sensor device of the brake system, the brake action data comprising at least braking torque data;
- the brake control device actuates the adhesion-based friction brake apparatus for a braking operation and associates brake actuation data and brake action data with one another, and monitors the data during a braking operation;
- the device diagnoses a function of the rail vehicle wherein the function is a state of motion, the state of motion including in motion and not in motion,
- a brake malfunction is determined based on the monitoring of the function of the rail vehicle and the associated brake action and brake actuation data,
- the braking operation is a test braking operation, and
- the brake control device performs a test braking operation during travel.

7. A rail vehicle comprising a brake control device wherein:
- the brake control device receives brake actuation data associated with the at least one adhesion-based friction brake apparatus from a brake actuation sensor device of the brake system, the brake actuation sensor device sensing a material deformation;
- the brake control device receives brake action data associated with the at least one adhesion-based friction brake apparatus from a brake action sensor device of the brake system, the brake action data comprising at least braking torque data; and
- the brake control device actuates the adhesion-based friction brake apparatus for a braking operation and associates brake actuation data and brake action data with one another, and monitors the data during a braking operation;
- the association is a ratio between the brake actuation data and the brake action,
- a brake malfunction is determined based on the monitoring of the function of the rail vehicle and the associated brake action and brake actuation data;
- the brake system is as claimed in claim 6.

8. A method for operating a brake system of a rail vehicle, the method comprising:
- actuating, using a brake control device, an adhesion-based friction brake apparatus of the brake system for a braking operation;
- receiving, using a brake control device, brake actuation data transmitted by a brake actuation sensor device of the brake system, the brake actuation sensor device sensing a material deformation;
- receiving, using the brake control device, brake action data transmitted by a brake action sensor device of the brake system, the brake action data comprising at least braking torque data;
- associating, using the brake control device, brake actuation data with corresponding brake action data; and
- monitoring, using the brake control device, mutually associated brake action data and brake actuation data;
- diagnosing a function of the rail vehicle wherein the function is a state of motion, the state of motion including in motion and not in motion,
- wherein a brake malfunction is determined based on the monitoring of the function of the rail vehicle and the associated brake action and brake actuation data
- wherein the braking operation is a test braking operation,
- wherein the brake control device performs a test braking operation during travel.

* * * * *